United States Patent [19]

Pelifian

[11] 4,114,894
[45] Sep. 19, 1978

[54] DEVICE FOR CANCELLING INSIDE FORCE OF PICKUP ARM OF RECORD PLAYER

[76] Inventor: Lenny M. Pelifian, 5 Marie St., Massena, N.Y. 13662

[21] Appl. No.: 803,644

[22] Filed: Jun. 6, 1977

[51] Int. Cl.² .............................................. G11B 3/10
[52] U.S. Cl. .................................................. 274/23 R
[58] Field of Search ..................................... 274/23 R

[56] References Cited

U.S. PATENT DOCUMENTS

| | | | |
|---|---|---|---|
| 1,895,126 | 1/1933 | Hilgenberg | 274/23 R |
| 3,088,742 | 5/1963 | Alexandrovich | 274/23 A |
| 3,292,935 | 12/1966 | Cooper | 274/23 R |
| 3,319,967 | 5/1967 | Zimmermann | 274/23 R |
| 3,380,744 | 4/1968 | Ohnishi et al. | 274/23 R |
| 3,492,006 | 1/1970 | Shimoda et al. | 274/23 R |
| 3,623,734 | 11/1971 | Sakamoto | 274/1 R |
| 3,645,541 | 2/1972 | Robertson-Aikman | 274/23 R |
| 3,722,893 | 3/1973 | Shimoda | 274/23 R |
| 3,730,536 | 5/1973 | Yuki | 274/23 R |
| 3,779,563 | 12/1973 | Irisawa | 274/23 R |
| 3,830,505 | 8/1974 | Rabinow | 274/1 R |
| 3,901,516 | 8/1975 | Yuki et al. | 274/1 D |
| 3,948,529 | 4/1976 | Wittenberg | 274/23 R |

*Primary Examiner*—Steven L. Stephan
*Attorney, Agent, or Firm*—Watson, Cole, Grindle & Watson

[57] ABSTRACT

A device for counteracting the inside force produced on the pickup arm of a record player includes a swing arm pivotally seated within an open end of a shaft mounted on the record player, the swing arm having weights thereon and being connected to the pickup arm to effect a following movement of the swing arm as the pickup arm moves toward the center of the turntable. The weights act to counterbalance the inside force produced by the pickup arm during movement thereof toward the turntable center so as to avoid undesirable shifting of the pickup arm when engaging a scratch or the like on the record. A cam surface at the interface of the shaft and the swing arm causes the swing arm to return to its initial rest position.

2 Claims, 4 Drawing Figures

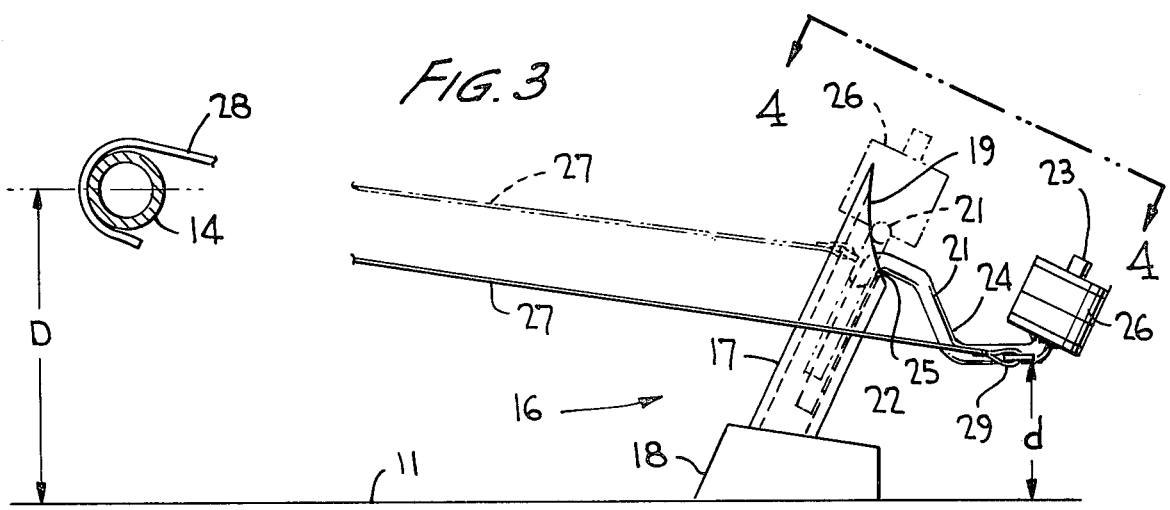
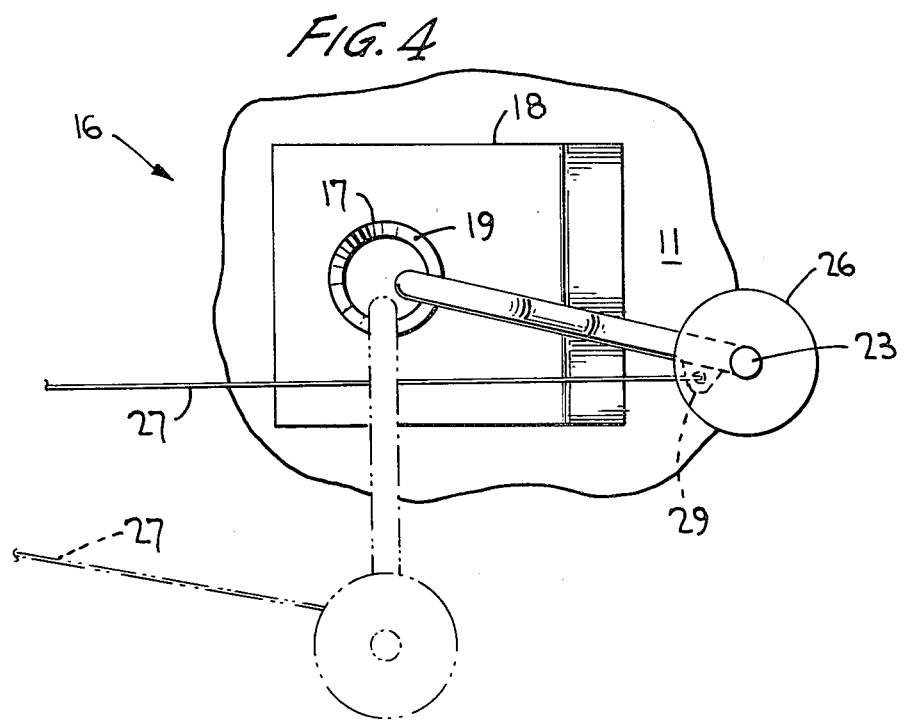

DEVICE FOR CANCELLING INSIDE FORCE OF PICKUP ARM OF RECORD PLAYER

BACKGROUND OF THE INVENTION

The invention relates generally to a device engagable with the pickup arm of a record player for counteracting the inside force produced during playback of a record, and more particularly to such device which is weighted and follows the pickup arm as it moves toward the center of the turntable and which has a cam means effecting a return movement as the pickup arm returns its movement away from the turntable center.

During the playback of a record, a component force is normally produced which urges the head of the pickup arm to move toward the center of the record as the pickup stylus contacts the sound groove surface. Such component force is generally referred to as an "inside force" of the head of the pickup arm which, if not counteracted during the playing operation, may impair the quality of the sound reproduced during playback.

The sound quality of the record is likewise impaired when the pickup stylus reaches a scratched or the like location of the record. The needle end or pickup stylus has a tendency to follow this groove, however slight, thereby "jumping" or shifting ahead due to the inside force produced.

Such inside force must therefore be counterbalanced or counteracted by a force acting in an opposite direction thereto. Various approaches have been used in the past to produce such a counteracting force such as, for example, means employing magnetic forces, weights, springs, levers and the like. However, such means have in general been found lacking in achieving the purpose for which they are devised.

SUMMARY OF THE INVENTION

In accordance with the invention a simple and economical and yet highly effective means has been devised for counteracting the inside force produced on the pickup arm during playback of a record. Such a means is mountable on a surface of the record player near the pickup arm, and includes a weighted swing arm interconnected with the pickup arm for following same during its movement toward the center of the turntable so as to counterbalance the inside force thereby produced. The pickup arm pivotally engages an open end of a shaft mounted on the record player, and a cam surface at such pivotal connection permits the swing arm to in effect follow the pickup arm during its return movement away from the center of the turntable. The shaft may be slanted toward the swing arm to enhance the return movement thereof, and the arms may be interconnected at a point on the swing arm lying at an elevation below that of the pickup arm so as to effect a downward pressure on the pickup arm during playback of the record.

BRIEF DESCRIPTION OF THE DRAWINGS

FIG. 3 is a side elevational view of the device according to the invention; and

FIG. 4 is a top plan view of the device of FIG. 3 taken substantially along line 4—4 thereof.

DETAILED DESCRIPTION OF THE INVENTION

Figure 1:
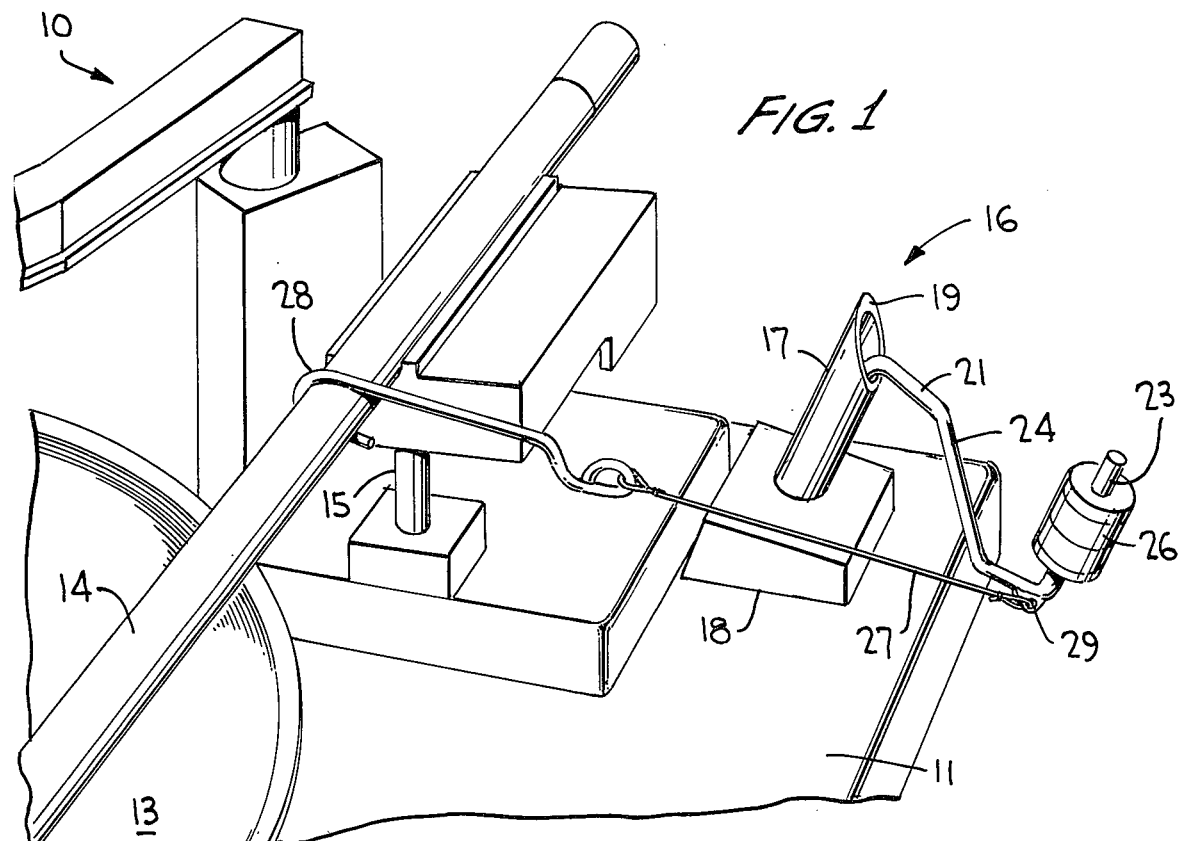
FIG. 1 is a perspective view of the device according to the invention shown in its relation to the pickup arm of a record player.
Figure 2:
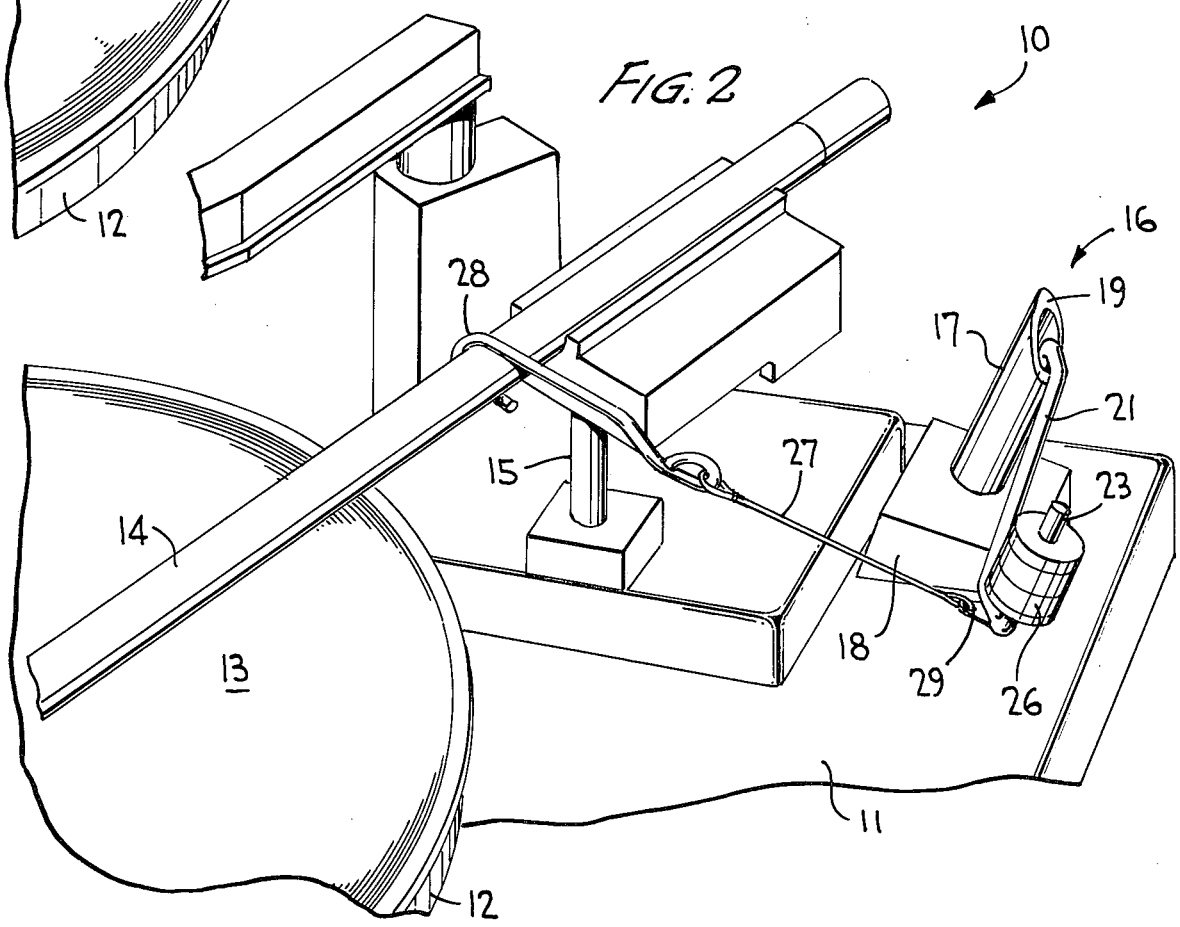
FIG. 2 is a view similar to FIG. 1 showing a forward following position of the swing arm of the device.

Turning now to the drawings wherein like reference characters refer to like and corresponding parts throughout the several views, a record player generally designated 10 is shown in FIGS. 1 and 2 as including a conventional support plate 11 having a turntable 12 rotatably mounted thereon. A phonograph record 13 is mounted over the center spindle (not shown) of the turntable, and a pickup arm 14 is mounted on a shaft 15 for pivotal movement about the axis of the shaft toward and away from the center of the turntable as in any known and conventional manner.

The device according to the invention is generally designated 16 in the drawings and includes a hollow shaft 17 secured to a base member 18 which is mounted on the top surface of support plate 11 in any normal manner as by means of an adhesive coating provided on the undersurface of base member 18. Shaft 17 has a downwardly sloping upper edge 19 defining a surface which effects a camming action with a swing arm 21. As shown more clearly in FIG. 3, this swing arm is substantially S-shaped in configuration having legs 22 and 23 extending outwardly in opposite directions from a central bent portion 24 of the swing arm. At an initial position of rest shown in FIG. 1 and in solid outline in FIGS. 3 and 4, swing arm 21 lies in a plane which is substantially perpendicular to the slightly curved plane in which sloping edge 19 lies. Also, shaft 17 lies in substantially the same plane as that containing swing arm 21, and the shaft slopes away from the vertical in a direction toward the swing arm as shown in FIG. 3.

Leg 22 of the swing arm extends into hollow shaft 17, and the shoulder or crease 25 between this leg 22 and bent portion 24 bears against sloping edge 19. One or more weights 26 are mounted on leg 23 of the swing arm. The pickup arm and the swing arm are hooked together by a flexible connector which may include a piano wire 27 or the like and a hook member 28. Wire 27 is connected as at 29 to the swing arm at an elevation d from support plate 11 which is less than the elevation D of the pickup arm above plate 11 (see FIG. 3).

In operation, as the pickup arm moves toward the center of the turntable during the playback of a record, swing arm 21 follows the inward movement of the pickup arm as the swing arm pivots about the axis of its leg 22. During such following movement the swing arm raises slightly upwardly to a position shown in phantom outline in FIG. 3 as the crease or shoulder 25 continues to bear against sloping edge 19 of the hollow shaft. And, with an appropriate weight of element 26 on the swing arm, a sufficient drag is produced for preventing the pickup arm from skipping during its inward movement when it reaches a scratch or other surface break on the surface of playing record 13. The inside force of the pickup arm which is normally produced during playback of the record would otherwise cause the pickup arm to skip or jump forward as the pickup stylus engages the surface scratch or other break in the record. However, the drag on the pickup arm effected by the present device sufficiently counteracts or nullifies this inside force so as to maintain the pickup stylus in its intended record playing groove without in any way hindering the normal playback operation. And, during playback of the record as the pickup arm moves inwardly toward the center of the turntable, the lower elevation $d$ at the interconnection of wire 27 and the swing arm as compared to the higher elevation D of the pickup arm, effects a slight downward pressure by the vertical weight component of weights 26 on the pickup arm so as to prevent it from lifting off the record during playback. This liftoff tendency of the pickup arm occurs when the inside force during playback is substantially counteracted by weights 26.

After completion of the playback, the pickup arm moves outwardly away from the center of the turntable toward its start position of FIG. 1. The swing arm follows this outward pickup arm movement without exerting any tension thereon. And, the pickup arm does not push or force the return movement of the swing arm; in fact, it could not because of the flexibility of wire 27. Instead, the swing arm returns to its initial rest position of FIG. 1, from that of FIG. 2 and as shown in phantom outline in FIGS. 3 and 4, simply by the force of gravity. The camming action between sloping edge 19 and the swing arm permits the swing arm to return to its initial position under the assistance of weights 26. The outward slope of shaft 17 further assists in allowing the swing arm to return to its initial rest position. The device is then ready for another playback operation.

From the foregoing it can be seen that a simple and economical yet highly effective device has been developed for producing drag on the pickup arm of a record player sufficiently to counteract the inside force thereby produced during playback of a record so as to avoid an inward skipping or jumping of the pickup stylus when it encounters a scratch or other surface irregularity on the record. The swing arm follows the pickup arm during inward movement thereof, and the swing arm returns to its initial position independent of the return outward movement of the pickup arm which takes place either manually or automatically.

Obviously, many modifications and variations of the present invention are made possible in the light of the above teachings. It is therefore to be understood that within the scope of the appended claims the invention may be practiced otherwise than as specifically described.

What is claimed is:

1. In a record player having an upper surface, a turntable mounted on said surface, a pickup arm mounted on a vertical rotatable rod extending upwardly from said surface, the pickup arm being moveable about the axis of the rod toward and away from the center of the turntable, a device for counteracting the inside force produced on the pickup arm during playback of a record, comprising, a hollow shaft having an upper end and being mountable on said upper surface, a swing arm in pivotal engagement with said upper end, means for interconnecting said arms to effect a following pivotal movement of said swing arm in one direction as said pickup arm moves toward the turntable center, cam means on said upper end for causing pivotal movement of said swing arm in a direction opposite said one direction during pickup movement away from the turntable center, said cam means comprising a downwardly sloping cam surface, and weight means mounted on said swing arm for counterbalancing the inside force produced by the pickup arm during movement thereof toward the turntable center.

2. The device according to claim 1, wherein said pickup arm lies at a first elevation during its movement toward the turntable center, a portion of said swing arm lying below said first elevation during movement thereof in said one direction, said interconnecting means including an elongated element attached to said swing arm at said portion thereof so as to produce a downward force on said pickup arm during playback of the record.

* * * * *